No. 638,300. Patented Dec. 5, 1899.
R. H. TRUMBULL.
MAGAZINE CAMERA.
(Application filed Jan. 3, 1899.)
(No Model.) 3 Sheets—Sheet 1.
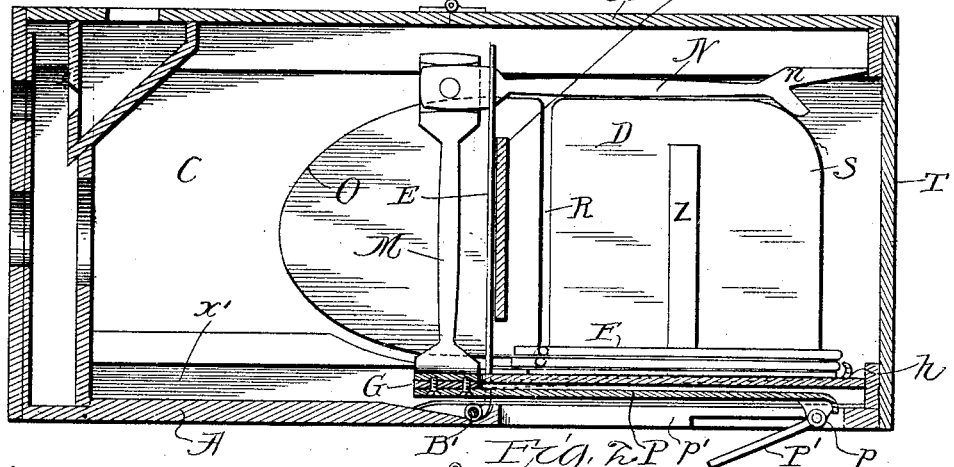
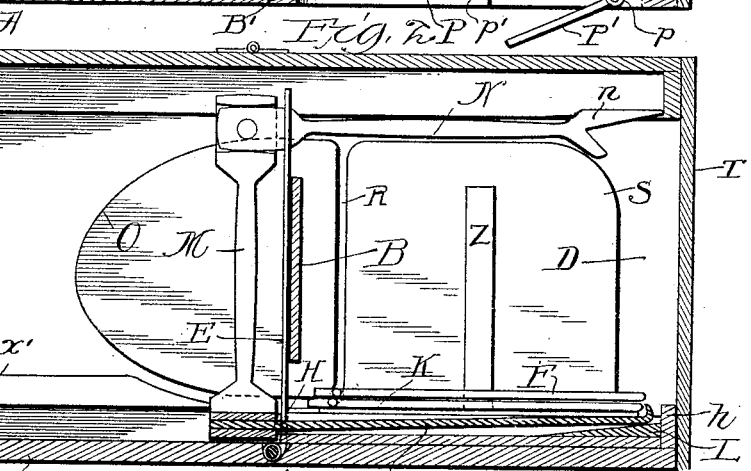
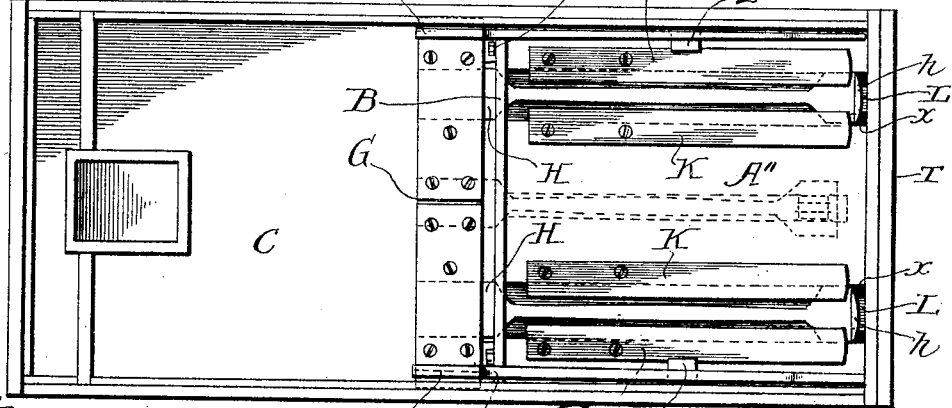
Witnesses Inventor
R. H. Trumbull
THE NORRIS PETERS CO., PHOTO-LITHO., WASHINGTON, D. C.

No. 638,300. Patented Dec. 5, 1899.
R. H. TRUMBULL.
MAGAZINE CAMERA.
(Application filed Jan. 3, 1899.)
(No Model.) 3 Sheets—Sheet 2.
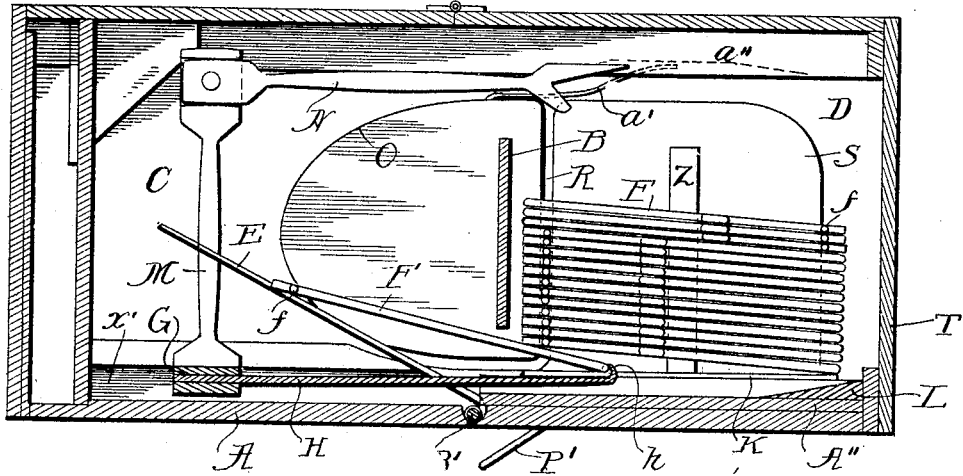
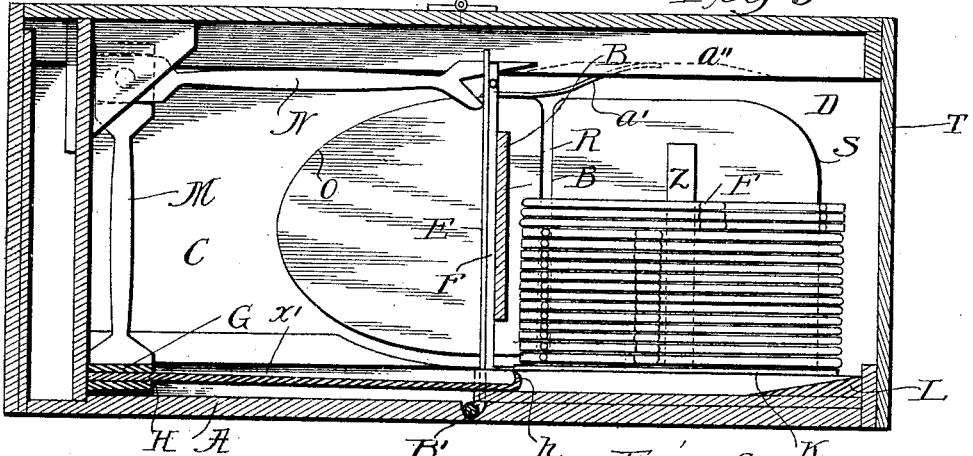
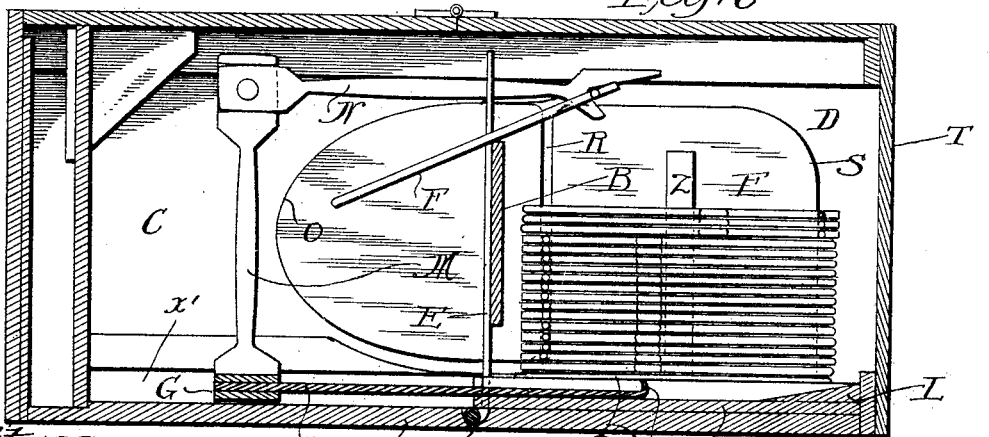

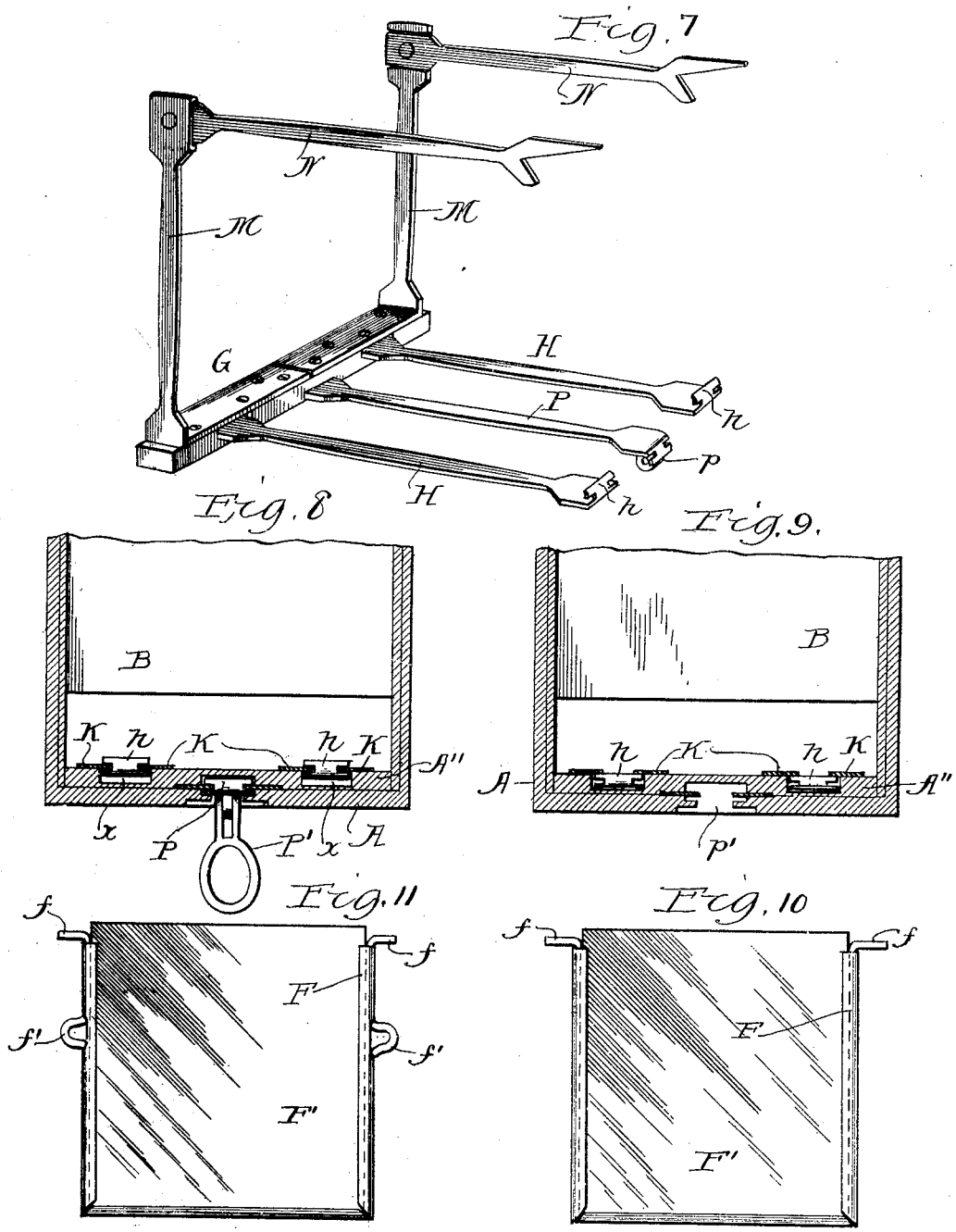

UNITED STATES PATENT OFFICE.

ROLLIN H. TRUMBULL, OF CHICAGO, ILLINOIS.

MAGAZINE-CAMERA.

SPECIFICATION forming part of Letters Patent No. 638,300, dated December 5, 1899.

Application filed January 3, 1899. Serial No. 701,007. (No model.)

*To all whom it may concern:*

Be it known that I, ROLLIN H. TRUMBULL, a citizen of the United States, residing at Chicago, in the county of Cook, in the State of Illinois, have invented a certain new and useful Improvement in Magazine-Cameras, of which the following is a description, reference being had to the accompanying drawings, forming part of this specification.

My invention relates to that class of cameras in which a supply of sensitized plates or films is stored in a chamber or magazine within the camera-casing and successively withdrawn therefrom and presented in the focal plane of the camera and after exposure returned to and stored in the magazine; and it has for its object the production of a simple and efficient camera of this character in which a large number of plates may be compactly held in a minimum space and in which the transfer of the plates from the magazine to the focal plane and their return to the magazine after exposure may be accomplished by the simple manipulation of a single handle or operating device. Its novelty will be hereinafter set forth, and particularly pointed out in the claims.

In the accompanying drawings, Figure 1 represents a middle longitudinal vertical section of the camera with the parts in normal position; Fig. 2, a longitudinal vertical section approximately on the line 2 2 of Fig. 3; Fig. 3, a top plan view with the top of the casing removed and the magazine empty; Fig. 4, a view corresponding to Fig. 2 with a supply of plate-holders in the magazine and with the lowermost plate partially withdrawn therefrom; Fig. 5, a similar view with the plate referred to completely withdrawn from the magazine and positioned in the focal plane ready for exposure; Fig. 6, a corresponding view with the plate withdrawn from the focal plane and in the course of its return movement to the magazine; Fig. 7, a perspective view of the transferring-frame by means of which the plate-holders are withdrawn from the magazine and returned thereto; Figs. 8 and 9, detail vertical cross-sections approximately on the line 8 8 of Fig. 2, with the parts in different positions in the two views; Fig. 10, an elevation or face view of one of the plate-holders and its contained plate, and Fig. 11 a corresponding view illustrating a modification of or addition to the plate-holder shown in Fig. 10.

The same letters of reference are used to indicate corresponding parts in all the views.

The casing A of the camera may consist of a box of any suitable shape and construction, in the present instance being approximately square in cross-section and of a length about twice its width and height. The rear half of its top preferably consists of a hinged lid A' and its rear end of a hinged door T. Its interior is divided into a forward exposure-chamber C and a rearward storage chamber or magazine D by a transverse vertical partition B of such width vertically as to leave free open spaces between its upper and lower edges and the top and bottom of the casing for the withdrawal of the plate-holders from the magazine and their return thereto. Secured to or formed upon the inner faces of the side walls of the casing are plates O and S, whose edges form guideways for the plate-holders in their passage from the magazine to position for exposure and return to the magazine, as hereinafter explained, the two plates O and S being also slightly separated from each other to form between them vertical guideways R.

The plate-holders F, Fig. 10, consist of rectangular skeleton frames formed of heavy wire bent into suitable shape and inclosed in sheet-metal sheaths, which form receptacles for the sensitized plates F', which are adapted to be slid into and removed from the holders in the usual manner. At its opposite edges, near one end, the holder F is provided with projections $ff$, in the present instance consisting of the outwardly-bent free ends of the piece of wire forming the body of the plate-holder. The bodies of the plate-holders are of such width as to properly fit between the guide-plates O S upon the opposite side walls of the casing, while the projections $f$ on the holders project farther outward beyond the edges of the plates O S, so as to travel upon the latter as guides.

The supply of plate-holders is placed in the magazine-chamber through the rear end of the camera, the hinged door T being opened for the purpose, and when in position in the magazine their projections $f$ fit and are confined in the vertical guideways R between the guide-plates O S, as in the case of the lower holders in Figs. 4 to 6. From this position in the magazine-chamber the plate-holders are to be drawn forward one by one beneath the partition B into the exposure-chamber C and carried to vertical position in the latter chamber for exposure and then returned over the top of the partition B to the magazine-chamber and deposited upon the stack of holders therein, and the means employed for this purpose may be now explained.

Journaled in the bottom of the casing A is a transverse rock-shaft B′, having secured to its opposite ends, adjacent the side walls of the casing, two vertically-extending arms E. A spring (not fully shown, but readily understood without illustration) is coiled about this rock-shaft at some suitable point and connected at one end to the rock-shaft and at the other to the casing, so as to exert its force upon the rock-shaft in such a way as to press the vertical arms E rearward and to be put under tension when those arms are forced forward and downward. These arms E coöperate with the projections $ff$ on the plate-holders when the holders are successively drawn forward from the under side of the pile of holders in the magazine and serve to press the forward ends of the holders upward as they are being withdrawn from the magazine, causing their projections $f$ to bear against and be guided by the curved edges of the plates O, as in the case of the holder being drawn forward from the magazine in Fig. 4, and when the holder has been completely withdrawn from the magazine, so that its lower rear end has been brought forward beneath the partition B and its projections $f$ have cleared the forward extremities of the guides O, the spring-arms will throw the plate-holder upward and rearward to vertical position and press it against the partition B, as shown in Fig. 5, in which position the plate-holder is in the focal plane ready for the exposure of its plate. The means for successively withdrawing the plate-holders from the magazine-chamber and thus bringing them into vertical position in the exposure-chamber consists of a reciprocating frame, as best shown in Fig. 7, where G is the main cross-bar thereof, and is provided with a rearwardly-projecting arm P, which has formed upon its rearward end a lug or eye $p$, extending downward through a middle longitudinal slot $p'$, Figs. 1 and 9, formed in the bottom of the casing A and having hinged to it a finger-piece P′, by means of which the transferring-frame may be slid forward in the casing from the position shown in Figs. 1, 2, and 3 to that shown in Fig. 5 and back again to normal position, the opposite ends of the cross-bar G being guided in such movement in guideways X′ on the side walls of the casing. The cross-bar G of this frame also has secured to it near its opposite ends two other rearwardly-extending arms H H, whose extreme rear ends are upturned or formed into hooks $h$, provided with notches or slots in their opposite sides. The rear half of the casing A is provided with a double bottom, the upper portion or false bottom A″ of which is provided with longitudinal grooves or guideways $x$, in which are confined and travel the rear ends of the arms H H. The bottom A″ is also provided with a middle longitudinal groove or guideway to accommodate the middle arm P, projecting rearwardly from the cross-bar G, as heretofore referred to. Secured to the bottom A″ of the casing at the opposite sides of the guideways $x$ are four spring-plates K, Figs. 3, 8, and 9, the inner edges of each pair projecting slightly over the adjacent groove or guideway $x$ in the bottom A″. These spring-plates K are secured to the bottom A″ at points near their forward ends, so that their rear ends are free to be sprung slightly upward from the bottom A″. The grooves $x$ in the bottom A″ are of sufficient depth to permit the upturned rear ends or hooks $h$ of the arms H of the transferring-frame to travel freely in the grooves entirely beneath the projecting edges of the spring-plates K, Fig. 9; but secured or formed in the bottom of each groove $x$ near its rear end is an incline L, upon which the rear ends of the arms H ride as they approach their limit of rearward movement and by which they are lifted against the resistance of the rear ends of the spring-plates K. As they reach their extreme limit of rearward movement their hooks $h$ will clear the ends of the plates K and the latter will spring downward flat against the bottom A″, and when the transferring-frame and its arms H are then moved forward again the notches or slots in the opposite sides of the hooks $h$ of the arms H will coincide with the edges of the spring-plates K and embrace them during the forward movement of the parts, as in Fig. 8, the upper ends of the hooks $h$ thus projecting above the bottom A″ and above the upper surface of the spring-plates K. Under this construction and arrangement of the parts it will be seen that whenever the transferring-frame is drawn rearward to its limit of movement the hooked rear ends of its arms H will be raised by the inclines L into position to engage the rear edge of the lowermost plate-holder F when the transferring-frame is again moved forward and that as it is so moved forward the notches in the sides of the hooks $h$ of said arms H will engage the edges of the spring-plates K, which engagement will hold the rear ends of the arms H in elevated position during their further forward movement, and thus maintain their engagement with the rear edge of the plate-holder which is being drawn forward until the parts reach a position in their forward movement which will permit the rear ends of the arms H to clear and become disengaged from the forward ends of the plates K, whereupon the rear ends of the arms H will drop or spring downward into the grooves $x$ beneath the horizontal plane of the plates K, and at the rearward movement of the transferring-frame they will travel rearward beneath the plates K and be again lifted into elevated position at the end of their rearward movement, as before explained. It results from the foregoing construction and operation of the parts that whenever the transferring-frame is moved forward the hooked rear ends of its arms H will engage the lowermost plate-holder F in the pile and pull it forward from beneath those resting upon it. At the beginning of such forward movement of the plate-holder its projections $f$ will contact with the spring-arms E and force the latter forward and downward as the plate-holder is advanced, the pressure of the spring-arms, however, serving to hold the projections $f$ of the plate-holder in engagement with the curved edges of the guide-plate O, so that they closely follow said guides during the forward and upward movement of the front end of the plate-holder, as shown in Fig. 4. As the transferring-frame reaches the forward limit of its movement the lower rear end of the plate-holder F will be brought to a position approximately beneath the partition B, with the result that the pressure of the spring-arms E against its forward end will throw the plate-holder into vertical position against the forward side of the partition B ready for the exposure of its plate. After exposure, by manipulation of any suitable shutter mechanism, (not illustrated,) the plate and its holder are to be carried rearward from the vertical position (shown in Fig. 5) and deposited upon the top of the pile of holders in the magazine-chamber, for which purpose the cross-bar G of the transferring-frame has secured to its opposite ends two vertically-projecting posts M M, Fig. 7, to whose upper ends are secured the rear ends of two rearwardly-extending arms N N, whose extreme rear ends are notched or forked, as shown, and have slight vertical play. In the forward and backward movement of the transferring-frame these arms N travel just outside the spring-arms E, between the latter and the guideways around the plates O and S, so that the projections $ff$ on the plate-holders extend into the paths of both the spring-arms E E and the arms N N of the transferring-frame. During the movement of the plate being transferred from the position shown in Fig. 4 to that shown in Fig. 5 the projections $ff$ of the plate, as the plate is thrown into the position of Fig. 5 by the action of the spring-arms E, will contact with the inclined lower jaws of the notched or forked rear ends of the arms N and lift the latter as the projections $ff$ pass and clear said jaws and come to rest in their path of rearward movement, as in Fig. 5. When the transferring-frame is pulled rearward, the forked rear ends of its arms N will engage the projections $f$ upon the vertical plate-holder and carry the latter rearward, as in Fig. 6, the rear surface of the holder resting upon and riding over the top of the partition B, and when the lower forward end of the plate-holder, in the rearward movement of the parts, passes rearward of and clears the upper edge of the partition B the plate-holder will drop upon the top of the pile of holders in the magazine-chamber with its projections $ff$ in rear of the rear edge of the guide-plate S, as will be readily understood.

In Fig. 11 the plate-holder is shown provided with a pair of supplemental projections $f'$, and for coöperation with plate-holders so provided there are shown vertical posts Z, secured to the side walls of the magazine-chamber and of a height approximately corresponding to that of the partition B. The purpose of the supplemental projections $f'$ on the plate-holder and these posts Z is to cause the plate to be temporarily supported in horizontal position when its forward end first clears the partition B in the rearward movement of the plate from the position shown in Fig. 6 and prevent its forward end dropping downward upon the pile of plates in the magazine-chamber before the plate has been moved far enough rearward for its projections $ff$ to drop downward behind the plates S. The result of this provision is that when the plate has been moved rearward far enough to become disengaged from the partition B it will simply drop very slightly in an approximately true horizontal position, with its supplemental projections resting upon the post Z and its projections $ff$ resting upon the curved rear corners of the plates S, and when the transferring-frame is pulled rearward to its limit of movement the plate will be carried farther rearward and disengaged from these supports and drop in horizontal position upon the top of the pile. These posts Z Z and the supplemental projections $f'f'$ on the plate-holder, while considered an advantage, are not at all essential to the successful and satisfactory operation of the camera.

For the further purpose of preventing the plate-holder getting back into the exposure-chamber after being exposed and moved to or toward the magazine-chamber there are shown provided in Figs. 1 and 2 spring-guards $a'$, secured at their forward ends to the upper edges of the plates O and bearing at their upturned rear ends against the bottom edges of longitudinal strips $a''$, secured along the upper edges of the side walls of the casing. In passing from the exposure-chamber to the magazine-chamber the projections $ff$ on the plate-holder ride over and depress the spring-guards $a'$, passing between their rear ends and the under edges of the strips $a''$, and the springs $a'$ thereupon prevent their return to the exposure-chamber. These spring-guards, while useful and of advantage for the purpose stated, are, like the posts Z and supplemental projections upon the plate-holder, in no way essential to the successful operation of the camera.

By reason of the fact that when the plateholders have been exposed they are returned to the magazine-chamber in reverse position to that occupied by them in said chamber before exposure it follows that their projections *f f*, which before exposure were confined in the vertical guides R, after exposure project laterally beyond the rear edges of the guide-plates S, with the result that when in such reverse position it is impossible for the lowermost plate-holder or any other to be moved forward into the exposure-chamber. When, therefore, all of the plates in the magazine-chamber have been once exposed, so that the lowermost plate in the pile is in reversed position, with its projections *f f* standing behind the rear edges of the guide-plates S, the transferring-frame when returned to its normal rearward position will become automatically locked owing to the fact that the hooked rear ends of its arms H will be forced upward into the plane of the lowermost plate-holder in the pile, while such plate-holder is prevented from moving forward by the engagement of its projections *f f* with the rear edges of the guide-plates S. The operator is thus advised by the automatic locking of the camera from operation that all of the plates in the magazine have been exposed.

It will be understood from the foregoing description that I have produced a magazine-camera of simple construction and few parts in which a maximum number of plate-holders may be stored in a minimum space and in which a plate-holder may be withdrawn from the magazine, brought into position for exposure, and returned to the magazine all by the simple forward and backward movement of a single slide or operating device, and that when the supply of plates in the magazine has been used up the camera becomes automatically locked from further operation, so that there is no possibility of a double exposure of any of the plates.

Having thus fully described my invention, I claim—

1. In a magazine-camera having a magazine-chamber and an exposure-chamber or focal chamber in fixed relation to each other, a reciprocating transferring device operating at a single movement in one direction to transfer a plate from the magazine-chamber to the exposure-chamber and position it for exposure, and operating at its stroke in the opposite direction to return such plate to the magazine-chamber, substantially as described.

2. In a magazine-camera having a magazine-chamber and an exposure-chamber or focal chamber in fixed relation to each other, a reciprocating transferring device operating at a single movement in one direction to withdraw the lowermost plate from the pile of plates in the magazine-chamber and carry it into the exposure-chamber and position it for exposure, and operating upon its stroke in the opposite direction to withdraw such plate from the exposure-chamber and return it to the magazine-chamber and deposit it upon the top of the pile of plates in the latter chamber, substantially as described.

3. In a magazine-camera having a magazine-chamber and an exposure-chamber or focal chamber in fixed relation to each other, a reciprocating transferring-frame provided with means operating at the forward movement of the frame to withdraw the lowermost plate from the pile of plates in the magazine-chamber and position it for exposure in the exposure-chamber, and with means operating at the rearward stroke of said frame to return such plate to the magazine-chamber and deposit it upon the top of the pile of plates in the latter chamber, substantially as described.

4. In a magazine-camera having an exposure-chamber and a magazine-chamber in fixed relation to each other and separated from each other by a vertical partition but communicating with each other by passages above and below said partition, a reciprocating transferring-frame operating at a single forward stroke to withdraw the lowermost plate in the pile in the magazine-chamber and carry it forward beneath said partition into the exposure-chamber and position it vertically against the forward side of said partition, for exposure, and operating at its rearward stroke to withdraw said plate from the exposure-chamber and carry it over the top of said partition into the magazine-chamber and deposit it upon the pile of plates in the latter chamber, substantially as described.

5. In a magazine-camera, the spring-arms E and the guides O adapted to coöperate with the plate-holders F, in combination with means for withdrawing the lowermost plate from the pile in the magazine-chamber and carrying it forward into the exposure-chamber, whereby upon transferring the plate from the magazine-chamber to the exposure-chamber it is properly positioned in the latter for exposure, substantially as described.

6. In a magazine-camera having the vertical partition B separating the exposure-chamber from the magazine-chamber but permitting free passage of the plates above and below it, the spring-arms E pressed toward or against the forward side of said partition, and the guides O, adapted to coöperate with the plate-holders F, in combination with means for withdrawing the lowermost plate-holder from the pile in the magazine-chamber and carrying it forward into the exposure-chamber, whereby such plate is guided by the guides O and carried by the spring-arms E into vertical position against the forward side of the partition B, substantially as described.

7. In a magazine-camera, the guides O and S at each side of the casing, separated from each other by the vertical guide-groove R, the guides O S and grooves R being adapted to coöperate with the projections *f f* on the plate-holders F, in combination with the spring-arms E and means for withdrawing the lowermost plate-holder from the pile in the magazine-chamber and carrying it forward into the exposure-chamber, substantially as described.

8. In a magazine-camera, the guides O and S at each side of the casing, separated from each other by the vertical guide-groove R, the guides O S and grooves R being adapted to coöperate with the projections $ff$ on the plate-holders F, in combination with the spring-arms E and means for withdrawing the lowermost plate-holder from the pile in the magazine-chamber, and carrying it forward into the exposure-chamber, and for returning the plate from the exposure-chamber to the magazine-chamber, substantially as described.

9. In a magazine-camera, the guides O O at opposite sides of the casing, their rear edges coöperating with the projections $ff$ upon the plate-holders F while the latter are resting in normal position in the magazine-chamber, and their forward edges coöperating with said projections as the plate-holder is carried forward into the exposure-chamber, in combination with means for withdrawing the lowermost plate-holder from the pile in the magazine-chamber and carrying it forward into the exposure-chamber, and means for maintaining the projections $ff$ of such plate-holder in engagement with the forward edges of the guides O O during such operation, substantially as described.

10. In a magazine-camera, the guides O O at the opposite sides of the casing, their vertical rear edges coöperating with the projections $ff$ upon the plate-holders F when the latter are resting in normal position in the magazine-chamber, and their curved forward edges adapted to coöperate with said projections as the plate-holder is drawn forward from the magazine-chamber into the exposure-chamber, in combination with the spring-arms E E operating to maintain the projections $ff$ of the plate-holder in engagement with the guides O O, and means for drawing forward the lowermost plate-holder from the magazine-chamber into the exposure-chamber, substantially as described.

11. In a magazine-camera, the fixed plates or projecting surfaces S S at opposite sides of the magazine-chamber, their vertical forward edges coöperating with the projections $ff$ upon the plate-holders F F when the latter are resting in normal position in the magazine-chamber, and their rear edges coöperating with said projections upon the plate-holders F which have been transferred to and from the exposure-chamber and rest in reversed position in the magazine-chamber, in combination with means for withdrawing the lowermost plate-holder from the magazine-chamber, carrying it forward into the exposure-chamber, and returning it in reversed position to the magazine-chamber, substantially as described.

12. In a magazine-camera, the vertical partition B separating the exposure-chamber from the magazine-chamber and permitting free passage of the plates from one chamber to the other below and above it, the guides O S at each side of the casing, separated from each other by the vertical grooves or guideways R and adapted to coöperate with the projections $ff$ upon the plate-holders F, in combination with the spring-arms E E and means for withdrawing the lowermost plate-holder from the pile in the magazine-chamber, carrying it forward into the exposing-chamber, and returning it to the top of the pile in the magazine-chamber, substantially as described.

13. In a magazine-camera, a reciprocating transferring-frame having rearwardly-extending arms H H provided with upturned hooks $h$ at their rear ends, in combination with the spring-plates K, the hooks $h$ of the arms H projecting above said plates K during the forward movement of the transferring-frame and traveling beneath the plates K during the rearward movement of said frame, substantially as described.

14. In a magazine-camera, a reciprocating transferring-frame having the hooked arms H H adapted to travel back and forth in the bottom of the magazine-chamber, in combination with the spring-plates K and inclines L, substantially as described.

15. In a magazine-camera, a reciprocating transferring-frame having the arms H H provided at their rear ends with the upturned notched hooks $h$, and adapted to travel in the bottom of the magazine-chamber, in combination with the spring-plates K and inclines L, substantially as described.

16. In a magazine-camera, a reciprocating transferring-frame having the hooked arms H H for withdrawing the lowermost plate-holder from the pile in the magazine-chamber and carrying it forward into the exposure-chamber, and the arms N N for returning the plate-holder to the magazine-chamber, in combination with suitable guides coöperating with the plate-holder in its passage to and from the exposure-chamber, whereby a single forward stroke of said transferring-frame carries the plate from the magazine-chamber into position for exposure in the exposure-chamber, and its rearward stroke returns it to the magazine-chamber, substantially as described.

17. In a magazine-camera, a reciprocating transferring-frame, having the hooked arms H H for withdrawing the lowermost plate-holder from the pile in the magazine-chamber and carrying it forward into the exposure-chamber, and the arms N N whose rear ends are forked or notched and capable of limited vertical play, and adapted to coöperate with the projections upon the plate-holder to return the latter to the magazine-chamber at the rearward stroke of said frame, substantially as described.

18. In a magazine-camera, the reciprocating transferring-frame composed of the cross-bar G, the rearwardly-extending hooked arms H H, the vertical posts M M, and the rearwardly-extending arms N N connected at their forward ends to the upper ends of the posts M M, and at their rear ends having a limited vertical play and shaped to coöperate with the projections on the plate-holders, substantially as described.

19. In a magazine-camera, the reciprocating transferring-frame operating at a single movement in one direction to transfer a plate from the magazine-chamber to the exposure-chamber and position it for exposure and at its stroke in the opposite direction to return such plate to the magazine-chamber and provided with a depending finger-piece or operating device P' passing through and adapted to travel back and forth in a middle longitudinal slot $p'$ in the bottom of the magazine-chamber, substantially as described.

20. In a magazine-camera, means for successively transferring the plates from the magazine-chamber to the exposure-chamber and returning them to the magazine-chamber after exposure, in combination with means for automatically locking such transferring means from operation when all of the plates in the magazine-chamber have been transferred to and returned from the exposure-chamber.

21. In a magazine-camera, a reciprocating transferring device operating at its stroke in one direction to transfer a plate from the magazine-chamber to the exposing-chamber, and at its stroke in the opposite direction to return said plate to the magazine-chamber, in combination with means for automatically locking such transferring device from operation when all of the plates in the magazine-chamber have been transferred to and returned from the exposure-chamber.

22. In a magazine-camera, means for withdrawing the lowermost plate from the pile in the magazine-chamber and carrying it forward into the exposure-chamber, and returning it in reversed position to the top of the pile in the magazine-chamber, in combination with means which prevents a plate occupying a reversed position in the magazine-chamber from being withdrawn into the exposure-chamber, whereby when a plate has been once transferred to the exposure-chamber and returned to the magazine-chamber it cannot be again withdrawn from the latter into the exposure-chamber.

23. In a magazine-camera in which the plates are withdrawn from the magazine-chamber into the exposure-chamber and returned in reversed position to the magazine-chamber, a stop or abutment coöperating with projections upon the plate-holders when the latter are in reversed position in the magazine-chamber and operating to prevent any such plate-holders being withdrawn from the magazine-chamber into the exposure-chamber.

ROLLIN H. TRUMBULL.

Witnesses:
FLORENCE KING,
EDWARD RECTOR.